(12) United States Patent
Hao et al.

(10) Patent No.: US 6,571,242 B1
(45) Date of Patent: May 27, 2003

(54) METHODS AND SYSTEMS FOR UPDATING A LAND USE AND LAND COVER MAP USING POSTAL RECORDS

(75) Inventors: Jianxiu Hao, Lexington, MA (US); Beato T. Cheng, Westford, MA (US); Norman Eugene Heckman, Bedford, MA (US)

(73) Assignee: Verizon Laboratories Inc., Waltham, MA (US)

( * ) Notice: Subject to any disclaimer, the term of this patent is extended or adjusted under 35 U.S.C. 154(b) by 252 days.

(21) Appl. No.: 09/624,728

(22) Filed: Jul. 25, 2000

(51) Int. Cl.[7] .............................................. G06F 17/30
(52) U.S. Cl. ......................... 707/6; 707/104.1; 707/5; 379/220.01
(58) Field of Search ......................... 707/6, 104.1, 5, 707/3, 4, 10, 201; 701/201; 382/318, 113; 342/357.13; 379/113, 220.01

(56) References Cited

U.S. PATENT DOCUMENTS

| | | | | |
|---|---|---|---|---|
| 4,757,267 A | | 7/1988 | Risken | 379/113 |
| 5,323,317 A | * | 6/1994 | Hampton et al. | 702/3 |
| 5,719,949 A | * | 2/1998 | Koeln et al. | 348/144 |
| 5,870,741 A | * | 2/1999 | Kawabe et al. | 707/75 |
| 5,901,214 A | * | 5/1999 | Shaffer et al. | 379/207.12 |
| 6,064,337 A | * | 5/2000 | Hirosawa | 342/357.06 |
| 6,125,367 A | * | 9/2000 | Na | 707/2 |
| 6,304,684 B1 | * | 10/2001 | Niczyporuk et al. | 382/318 |

* cited by examiner

Primary Examiner—Charles Rones
Assistant Examiner—Hassan Mahmoudi
(74) Attorney, Agent, or Firm—Leonard Charles Suchyta; James K. Weixel

(57) ABSTRACT

Systems and methods are presented to classify a region on a map, or to update a preexisting classification of the region. The method utilizes postal records, associated with geographic positions, and corresponding land classifications to classify the region or to update the preexisting classification.

9 Claims, 13 Drawing Sheets

METHODS AND SYSTEMS FOR UPDATING A LAND USE AND LAND COVER MAP USING POSTAL RECORDS

FIELD OF THE INVENTION

This application relates to the field of digital cartography, and more particularly to classifying a region in a land use and land cover map and/or updating a classification of the region using postal records.

BACKGROUND OF THE INVENTION

The Land Use and Land Cover (LULC) map of the United States, produced by the United States Geological Survey (USGS), classifies areas on a map according to the use and/or cover of the areas. At least nine major classifications may be used, including urban, agricultural, and forest. The map may also provide related information about political units and federal land ownership.

The LULC map has numerous applications, including producing cartographic products, base map plotting, radio propagation modeling, and various kinds of spatial analyses. Land use classifications important to radio propagation modeling, for example, include transportation, industrial, water, forest, built-up residential and commercial classifications. The map data may also be combined with other geographically referenced data for automated analysis in support of numerous decision making processes. These, and many other applications, attest to the usefulness of maps that deal with LULC.

Because of obsolescence, however, in the last several years the LULC map has not been as useful as it might otherwise be. The existing USGS LULC map for the US was created in the 1970s using data that may be even older. Since then, advances in the US economy, notably in transportation and construction, have had a great impact on infrastructure and population distribution. Hence, significant changes in LULC have occurred during the last twenty years, a period in which up-to-date and accurate LULC information continued to be a key requirement for many applications listed above.

The USGS LULC information may be updated through satellite images, usually at scales smaller than 1:60,000. In particular, a basic source of land use data is NASA high-altitude aerial photographs. In addition, National High-Altitude Photography program photographs may be used to obtain information about the use and cover of land in various geographic regions.

Updating LULC maps from such images, however, has at least four disadvantages: (i) it is difficult to distinguish accurately in satellite images between commercial and residential built-up categories, (ii) it is expensive, (iii) satellites must be launched into space using equipment that is prone to failures and delay, and (iv) satellites may fall into disrepair while in orbit and may not be available for geographic imaging. Thus, there exists a need for systems and methods capable of updating land use and land cover map data that distinguish accurately between commercial and residential areas, are less expensive than satellite imagery, and are reliable.

SUMMARY OF THE INVENTION

The systems and methods described herein help to overcome the aforementioned problems pertaining to accuracy, expense, and reliability of updating an LULC map. In one embodiment of the present invention, a method is provided wherein ZIP+4 data and their corresponding classifications, available from the United States Postal Service, may be used to accurately and reliably classify and/or update regions on the LULC map as residential or commercial. Such use of the ZIP+4 data may also be less costly than that associated with the traditional use of satellite images.

In particular, a method for classifying a region on a map is presented hereinafter that includes identifying a particular region on a map, the region being associated with a particular geographic position. The method further includes obtaining two sets of postal records, such as ZIP+4 codes, each record in the first set having a corresponding geographic position, and each record in the second set having a corresponding classification. The first set contains a particular postal record to which the particular geographic position corresponds, and the second set also contains this particular postal record to which a classification corresponds. The geographic position may be specified by a latitude and longitude, while the classification may include a highrise, commercial, and/or residential classification. Subsequently, the particular region may then be classified with the particular classification.

A method for updating a classification of a region on a map is also presented below. The method includes obtaining a first set of postal records, each record having a corresponding classification, and obtaining a second set of postal records, each record having a corresponding geographic position. The method further includes identifying a match between a postal record in the first set and a postal record in the second set, and then using the geographic position corresponding to the postal record in the second set identified in the match to locate a region to be updated on the map. The classification of the region on the map may then be updated by substituting the classification of the region to be updated with the classification corresponding to the postal record in the first set identified in the match.

Also presented below is a method for classifying a region on a map. The method includes obtaining a first set containing at least one member, wherein each member of the first set includes a postal record and a corresponding geographic position. The method also includes obtaining a second set containing at least one member, wherein each member of the second set includes a postal record and a corresponding classification. From these two sets, a third set may be constructed containing at least one member, wherein each member of the third set includes a geographic position from the first set and an associated classification from the second set; in this last step, a classification is associated with a geographic position if both the classification and the geographic position correspond to a common postal record. Subsequently, a region located at a geographic position from the third set may be classified with the associated classification.

A method for updating land use and land cover data that provide a land classification of a region on a map is also presented below. The method includes obtaining a postal record, associated with the region, and a corresponding land classification. The postal record may include a ZIP+4 code, and the land classification may include a highrise, commercial, or residential classification. The method further includes updating the data by replacing the land classification of the region on the map with the corresponding land classification.

The step of updating the data may further include obtaining a first bitmap that associates the region with the land classification, constructing a second bitmap that associates the region with the corresponding land classification, and overlaying the second bitmap on the first bitmap to update the data. In addition, the step of updating the data may further include dilating, and filtering the data to more clearly indicate the classification of the region.

Also presented below is a system for updating land use and land cover data that provide a land classification of a region on a map. The system may include a database having a postal record, associated with the region, and a corresponding land classification. The system may further include a processor, coupled to the database, for updating the data by replacing the land classification of the region on the map with the corresponding land classification.

BRIEF DESCRIPTION OF DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

To provide an overall understanding of the invention, certain methods, and systems will be discussed with reference to utilizing ZIP+4 data to update LULC map data. However, it will be understood by persons of ordinary skill in the art that the methods, and systems described herein may be modified while still remaining within the scope of the invention. In particular, principles of the invention described below may be used to classify LULC map data by utilizing other types of postal records besides ZIP+4.

Figure 1A:
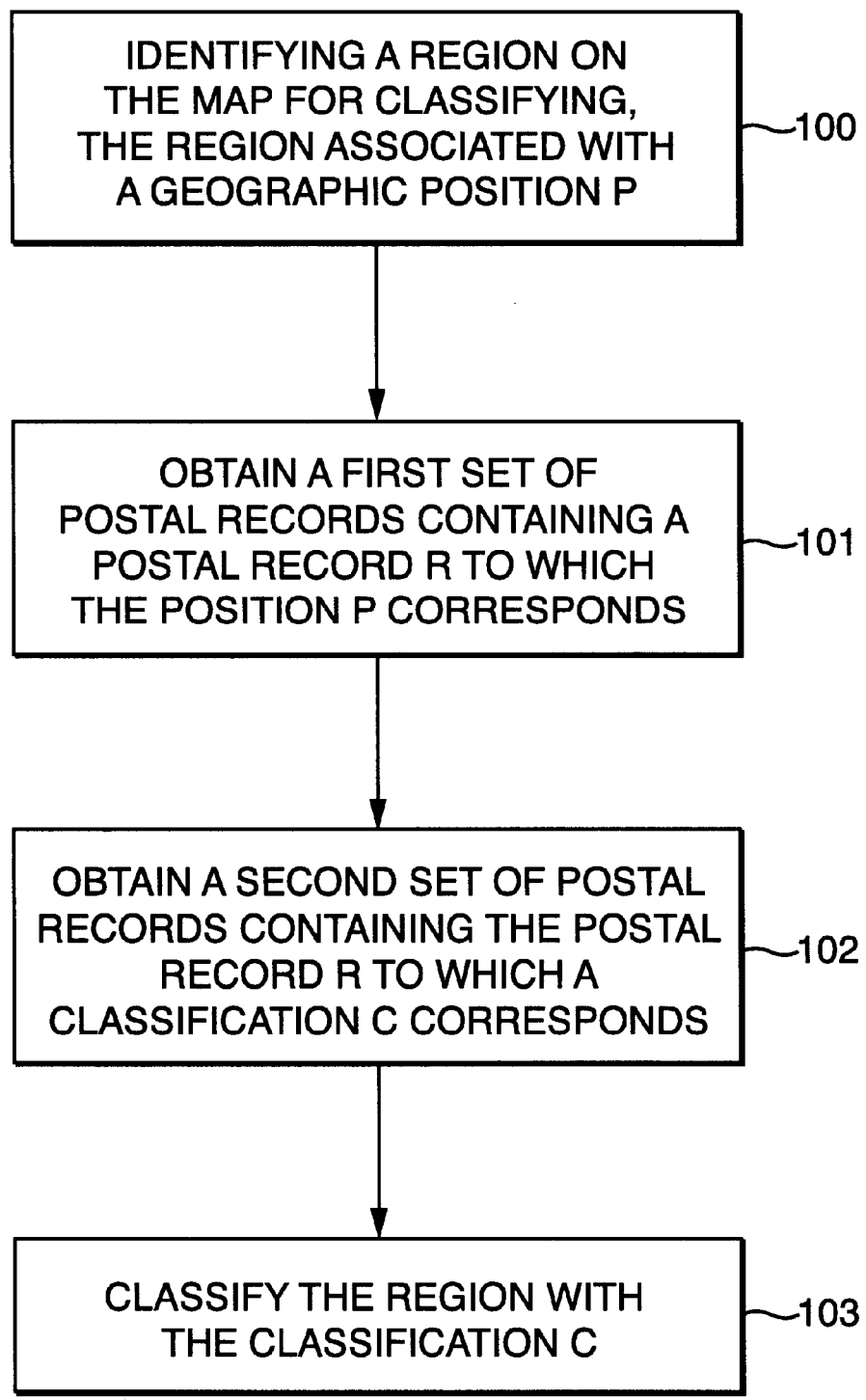
FIGS. 1a–1b illustrate steps taken to process data for classifying a region on a map, and the interrelationship of the data in one embodiment of the present invention.

Referring to FIG. 1a, a flowchart is provided indicating some high-level steps that may be taken to classify a region on a map. In one embodiment, the map may include an LULC bitmap, in which case the region may be associated with an area on the bitmap that corresponds to a pixel. In step 100, a particular region on the map may be identified for classifying, the region associated with a particular geographic position. In step 101, a first set of postal records is obtained that contains a particular postal record to which the particular geographic position corresponds. In one embodiment, the postal record may include a ZIP+4 code, and the corresponding geographic position may be specified by giving a latitude and a longitude that indicates a position on or within an area that is serviced by the ZIP+4 code. In step 102, a second set of postal records is obtained that contains the particular postal record that is contained in the first set, and to which a particular classification corresponds. In one embodiment, the classification may include a highrise, commercial, and/or residential classification. In step 103, the particular region may be classified by assigning it the particular classification.

It may happen that one region (e.g., a region that is associated with a pixel) may be serviced by two or more ZIP+4 codes, with each ZIP+4 code corresponding to a different classification. In such case, there may be some ambiguity assigning a classification to a pixel. In one embodiment, this ambiguity may be resolved by establishing a hierarchy of classifications, so that, for example, the highrise classification takes precedence over the commercial classification which takes precedence over the residential classification. Thus, if three ZIP+4 codes, with one being classified as commercial and the other two as residential, service one region, the region may be assigned a commercial classification since in this example, the commercial classification takes precedence over the residential classification.

Figure 1B:
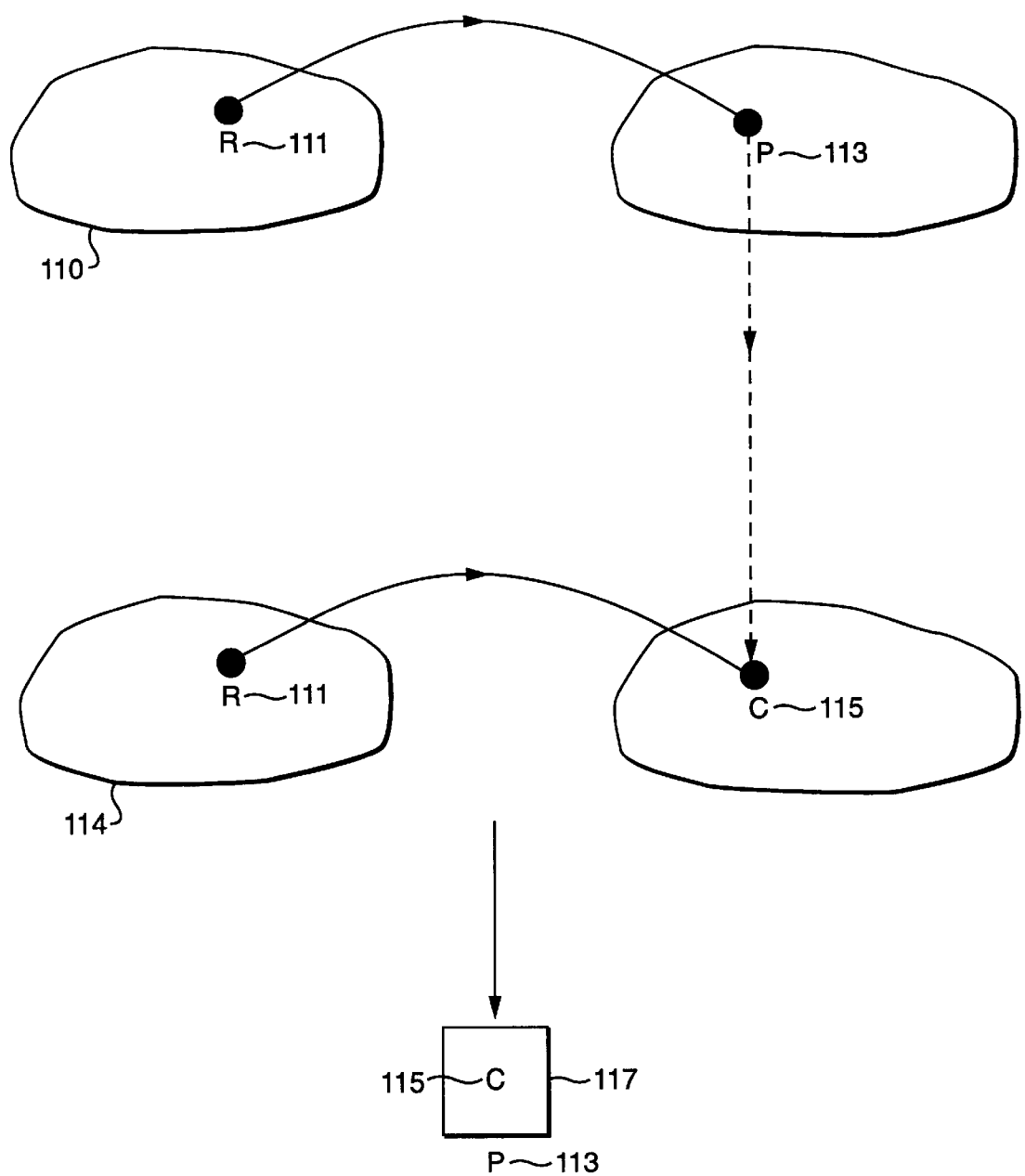

In FIG. 1b, an example is presented indicating interrelationships of data for classifying a region associated with a particular geographic position p that were provided in connection with the flowchart in FIG. 1a. A first set of postal records 110 contains a postal record r 111, to which the geographic position p 113 corresponds. In one embodiment, the postal record r 111 includes a ZIP+4 code. A second set of postal records 114 also contains the postal record r 111 to which the classification c 115 corresponds. In one embodiment, the classification c 115 can include at least one of a highrise, commercial, or residential classification. The geographic position p 113 may thus be associated with the classification c 115. A region 117 on a map, corresponding to the geographic position p 113, may then be assigned the classification c 115.

In one embodiment, a particular region may first be chosen before seeking to obtain postal data to classify the particular region, as in the steps of FIG. 1a. In a different embodiment, postal data may first be obtained without regard to what particular regions are associated with the postal records in the data. The postal data may then furnish classifications for regions that are associated with postal records in the data.

In an example of an embodiment in which postal data may first be obtained without regard to what particular regions are associated with the postal records in the data, a method for updating may include obtaining a first set of postal records, each record having a corresponding classification. The method may further include obtaining a second set of postal records, each record having a corresponding geographic position. Subsequently, a match may be identified between a postal record in the first set and a postal record in the second set. The geographic position corresponding to the postal record in the second set identified in the match may then be used to locate a region to be updated on the map. The classification of the region on the map may subsequently be updated by substituting the classification of the region to be updated with the classification of the postal record in the first set identified in the match.

Figure 2A:
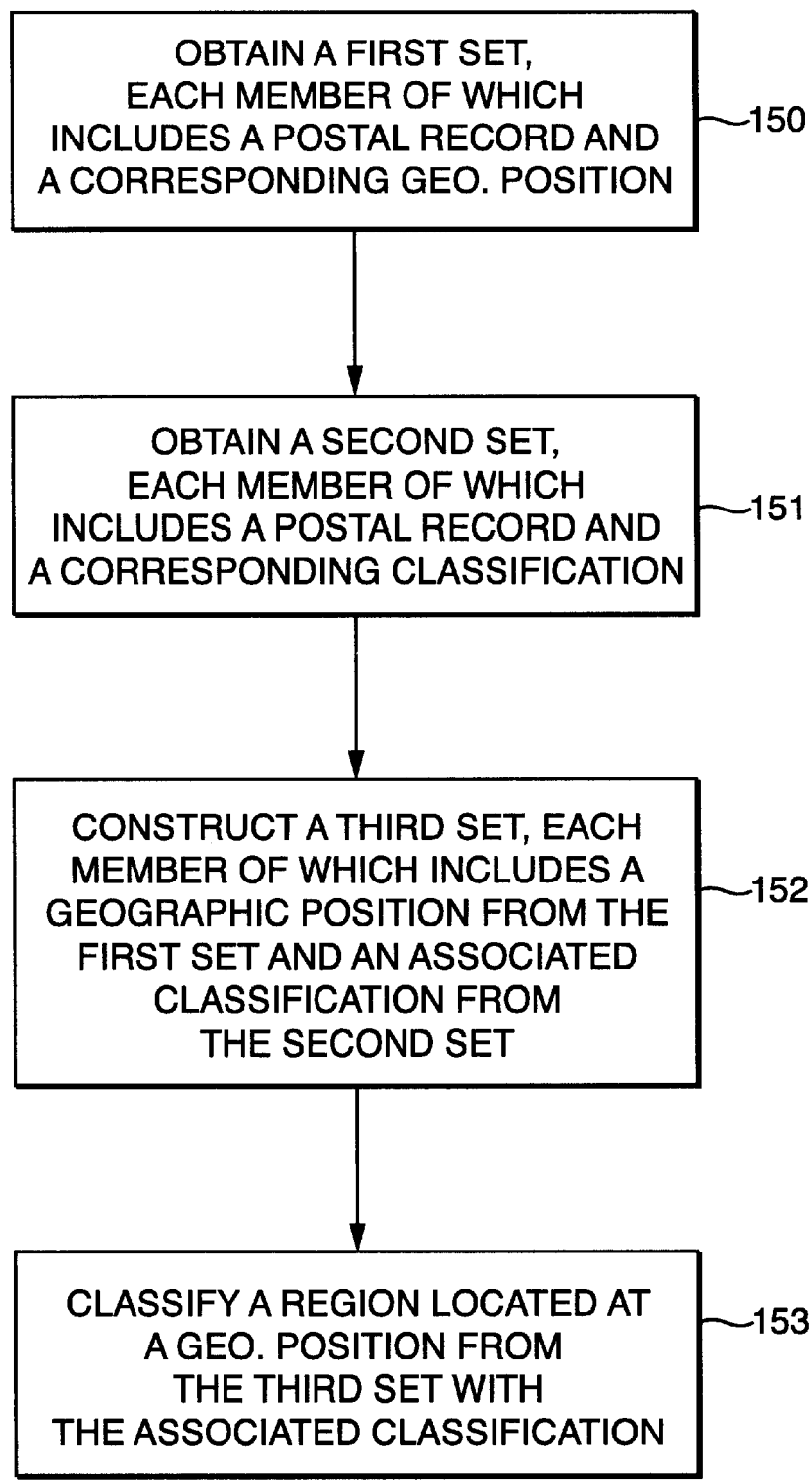
FIGS. 2a–2b illustrate steps taken to classify a region on a map, and the interrelationship of data utilized for this purpose in one embodiment of the present invention.

Referring now to FIG. 2a, a flowchart is provided indicating some high-level steps that may be taken to classify a region on a map according to one embodiment of the present invention. In step 150, a first set is obtained, each member of which includes a postal record and a corresponding geographic position. For example, tables of ZIP+4 codes and their corresponding geographic positions, in latitude and longitude, are available from commercial vendors such as Geographic Data Technology (GDT™), Inc., Lebanon, N.H. In step 151, a second set is obtained, each member of which includes a postal record and a corresponding classification. For example, tables of ZIP+4 codes and their corresponding classification, which may include a highrise, commercial, and residential classification, are provided by the United States Postal Service. In step 152, a third set is constructed containing at least one member, wherein each member of the third set includes a geographic position from the first set and an associated classification from the second set, the geographic position from the first set and the associated classification from the second set each corresponding to a common postal record. Subsequently, in step 153, a region located at a geographic position from the third set is classified with the associated classification.

Figure 2B:
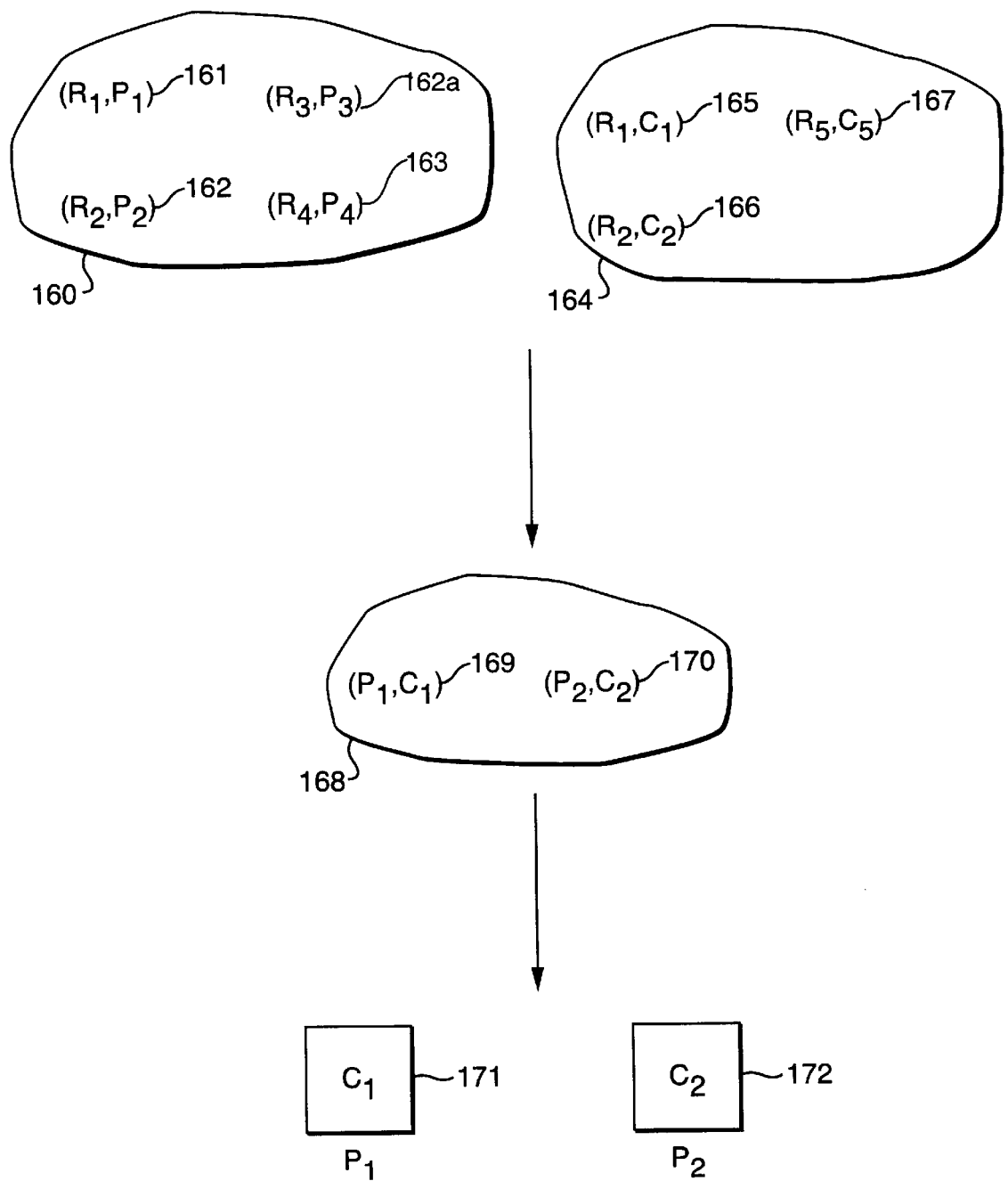

In FIG. 2b, an example is presented indicating interrelationships of the data for classifying a map that were provided in connection with the flowchart in FIG. 2a in one embodiment of the present invention. A first set 160 contains at least one member. In this example, the first set 160 contains four members: the first member 161 of the first set 160 includes a postal record r1 and a corresponding geographic position p1, and the second member 162 of the first set 160 includes a postal record r2 and a corresponding geographic position p2. Two other members 162a and 163 of the first set 160 are also shown. A second set 164 contains at least one member. In this example, the second set 164 contains three members: the first member 165 of the second set 164 includes a postal record r1 and a corresponding classification c1, and the second member 166 of the second set 164 includes a postal record r2 and a corresponding classification c2. Another member 167 of the second set 164 is also shown. In this example, the postal records r1, r2, r3, r4 and r5 are five distinct postal records. A third set 168, assumed to contain at least one member, may be constructed from the aforementioned first and second sets. Each member of the third set includes a geographic position from the first set and an associated classification from the second set. A classification is associated with a geographic position if both the classification and the geographic position correspond to a common postal record. In particular, the geographic position p1, from the member 161, and the classification c1, from the member 165, each correspond to a common postal record, viz., r1. Thus, there appears a first member 169 of the third set 168 including p1 and c1, where the classification c1 is said to be associated with the geographic position p1. Likewise, the geographic position p2, from the member 162, and the classification c2, from the member 166, each correspond to a common postal record, viz., r2. Thus, there appears a second member 170 of the third set 168 including p2 and c2, where the classification c2 is said to be associated with the geographic position p2. A first region of a map 171 located at the geographic position p1 from the third set 168 may be classified with the associated classification c1. Likewise, a second region of a map 172 located at the geographic position p2 from the third set 168 may be classified with the associated classification c2.

In one embodiment of the present invention, at least five sources of information may be used to update LULC map data: (i) public domain USGS LULC information available, for example, from the Internet; (ii) current ZIP+4 information available from the United States Postal Service, which may provide postal records, such as ZIP+4, and corresponding classifications; (iii) ZIP+4 centroid location data in longitude and latitude available from commercial vendors such as Geographic Data Technology (GDT™), Inc., Lebanon, N.H., which may provide postal records, such as ZIP+4, and corresponding geographic positions; (iv) addresses of commercial and business ventures available from vendors such as InfoUSA™, Foster City, Calif.; and (v) current highway data from commercial vendors such as GDT™. As detailed below, these input data may be used to update an LULC map for a particular region.

In addition, several processing tools may be utilized to help update LULC map data. For example, PCI™, an image processing environment for remote sensing applications, may provide an environment for manipulation and visualization of image data. PCI™ may further provide a platform to store, handle, and view map files. Software obtained from other commercial vendors or the public domain, or software specifically written for updating LULC map data may also be imported into PCI™. For example, filtering software may be integrated with PCI™ to manipulate map data, as is explained below. PCI™ also permits the importation of procedures to help with the integration of functions and the storing of data, and also provides a scripting language to write algorithms for updating LULC map data.

In different embodiments, other software besides PCI™ could be used for helping update LULC map data. This software might include procedures performing similar tasks to PCI™ written specifically for updating LULC map data.

The source data described above may be organized as data layers (or channels) in, for example, a PCIDSK formatted file. With each layer may be associated several attributes. These layers and associated attributes may be related to produce suitability or site selection map data. Images may be queried by pointing to a pixel, and several layers of attribute information may thereby be presented interactively. The manipulation and visualization of image data may then occur in and between these data channels. As detailed below, PCI™'s high level scripting language, EASI, may be used to accept user input, control the flow of data, and update the LULC map data.

Figure 3:
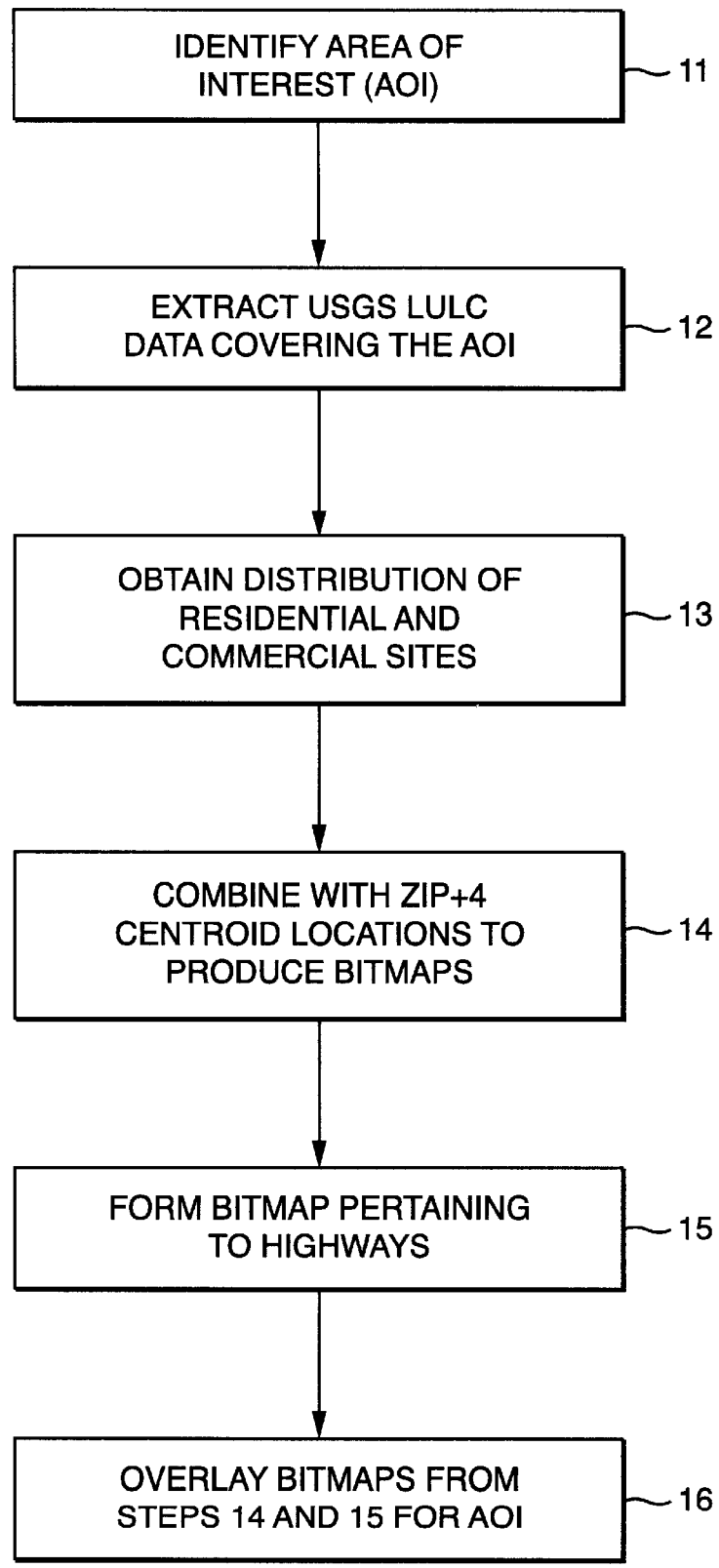
FIG. 3 is an example of a flow chart including steps to update LULC data in one embodiment of the present invention.

Referring to FIG. 3, a flow chart is provided with representative steps for updating LULC data, in accordance with one embodiment of the invention. In step 11, an area of interest (AOI), encompassing perhaps several regions on a map, may be defined. The AOI may be rectangular and specified by giving two opposite corners in latitude and longitude, for example. Next, in step 12, the LULC bitmap covering the AOI is extracted from USGS LULC data. In step 13, information pertaining to the location of commercial and residential sites in the AOI is obtained from ZIP+4 databases, and possibly other databases, such as an InfoUSA™ database. In step 14, the information obtained from step 13 is combined with ZIP+4 centroid locations to generate a residential bitmap and commercial bitmap for the AOI. ZIP+4 centroid location data, which may be obtained from commercial vendors such as GDT™, helps provide a latitude and longitude corresponding to a particular ZIP+4. In step 15, another bitmap may be optionally formed pertaining to highways from highway data provided by GDT™. The vector format GDT™ highway data may be rasterized into a bitmap before being used to update the USGS LULC map data. (In the embodiment that includes step 15, highway data may be used to update the USGS LULC map data with road information; in other embodiments, the USGS LULC map data may be updated without using highway data. In embodiments where the map data is updated without using highway data, step 15 and any other steps detailed below dealing with highway data may be omitted.) In step 16, the bitmaps from steps 14 and 15 are overlayed onto the bitmap extracted from step 12 to produce an updated LULC map for the AOI.

As is apparent to someone of ordinary skill in the art, the order in which some of the steps in the flowchart in FIG. 3 (and in the flowcharts introduced herein) are executed may be interchanged. For example, instead of using ZIP+4 data to obtain the location of commercial, and residential areas in step 14, and then using highway data in step 15, the highway data may alternatively be compiled before the ZIP+4 data. Also, instead of forming two individual bitmaps for residential and commercial sites, one bitmap containing both residential and commercial sites may be formed. This one bitmap, together with the highway data bitmap may then be overlayed on USGS LULC bitmap.

More details of steps 12–14, and 16 of FIG. 3 are presented in FIGS. 4a, 4b, 5a, and 5b. For some AOIs, the ZIP+4 data may have to be supplemented with additional information to determine if a region within the AOI is residential or commercial. In one embodiment, this supplemental information may be a business listings data base such as that provided by InfoUSA™, which may be utilized in accordance with the steps presented in FIGS. 4a and 4b to help update the LULC map data. Instead of using an InfoUSA™ data base, other business listings data bases, such as Acxiom™, Conway, Ark., may be employed. In a different embodiment, business listings data bases need not be used to update the LULC map data. Instead, the LULC map data itself may be used to supplement the ZIP+4 data. In such case, the steps in FIGS. 5a and 5b may be taken to help update LULC map data without the use of business listings data bases such as InfoUSA™, and Acxiom™.

Figure 4A:
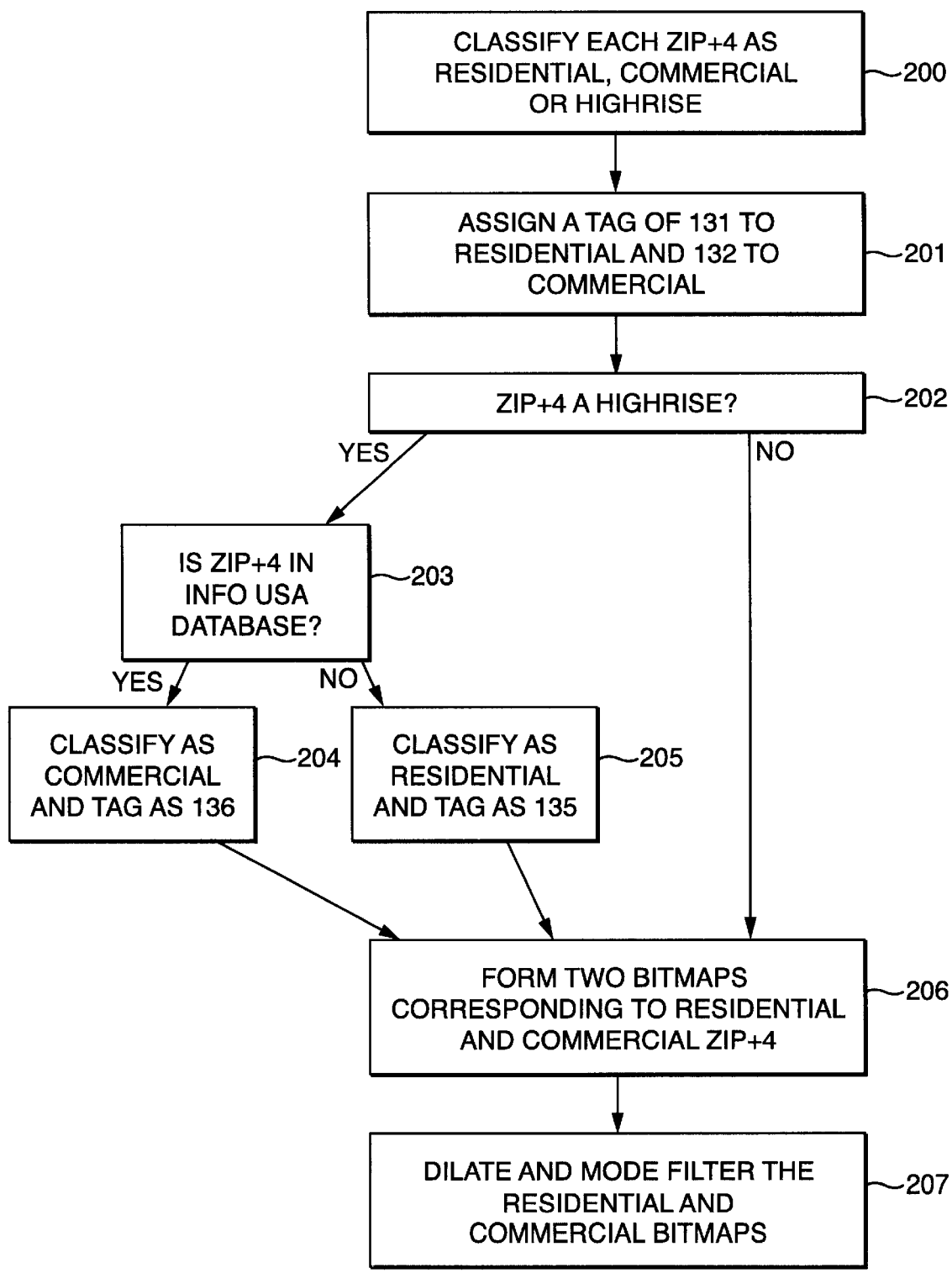
FIGS. 4a and 4b are examples of flow charts including steps to help update LULC map data with the use of an InfoUSA™ database in one embodiment of the present invention.

More specifically, in FIG. 4a, an example of a flow chart is presented that includes more details of steps 12–14 of FIG. 3. In step 200, each ZIP+4 in the AOI is classified as residential, commercial, or highrise by using the US Postal Service's ZIP+4 data. In step 201, the residential, and commercial ZIP+4s are assigned tags of 131 and 132, respectively. In step 202, there is a branch in the flow depending on whether or not the ZIP+4 corresponds to a highrise. If the ZIP+4 does correspond to a highrise, step 203 is taken in which another branch in the flow occurs depending on whether or not the ZIP+4 is in the InfoUSA™ database. If it is in the database, in step 204, the ZIP+4 is classified as commercial and given a tag of 136. If it is not in the database, in step 205, the ZIP+4 is classified as residential and given a tag of 135. In either case, the flow proceeds to step 206. If the ZIP+4 does not correspond to a highrise, step 206 is taken in which two bitmaps are formed. The two bitmaps may be formed with the help of ZIP+4 centroid location data available from such commercial vendors as GDT™. The residential bitmap has pixel values that are equal to 131, 135 (corresponding to pixels that were classified as highrise before being classified as residential), or, for the null background, zero. The commercial bitmap has pixel values that are equal to 132, 136 (corresponding to pixels that were classified as highrise before being classified as commercial) or, for the null background, zero. In the last step of FIG. 4a, these two bitmaps are dilated and mode filtered in step 207, as described below.

Figure 4B:
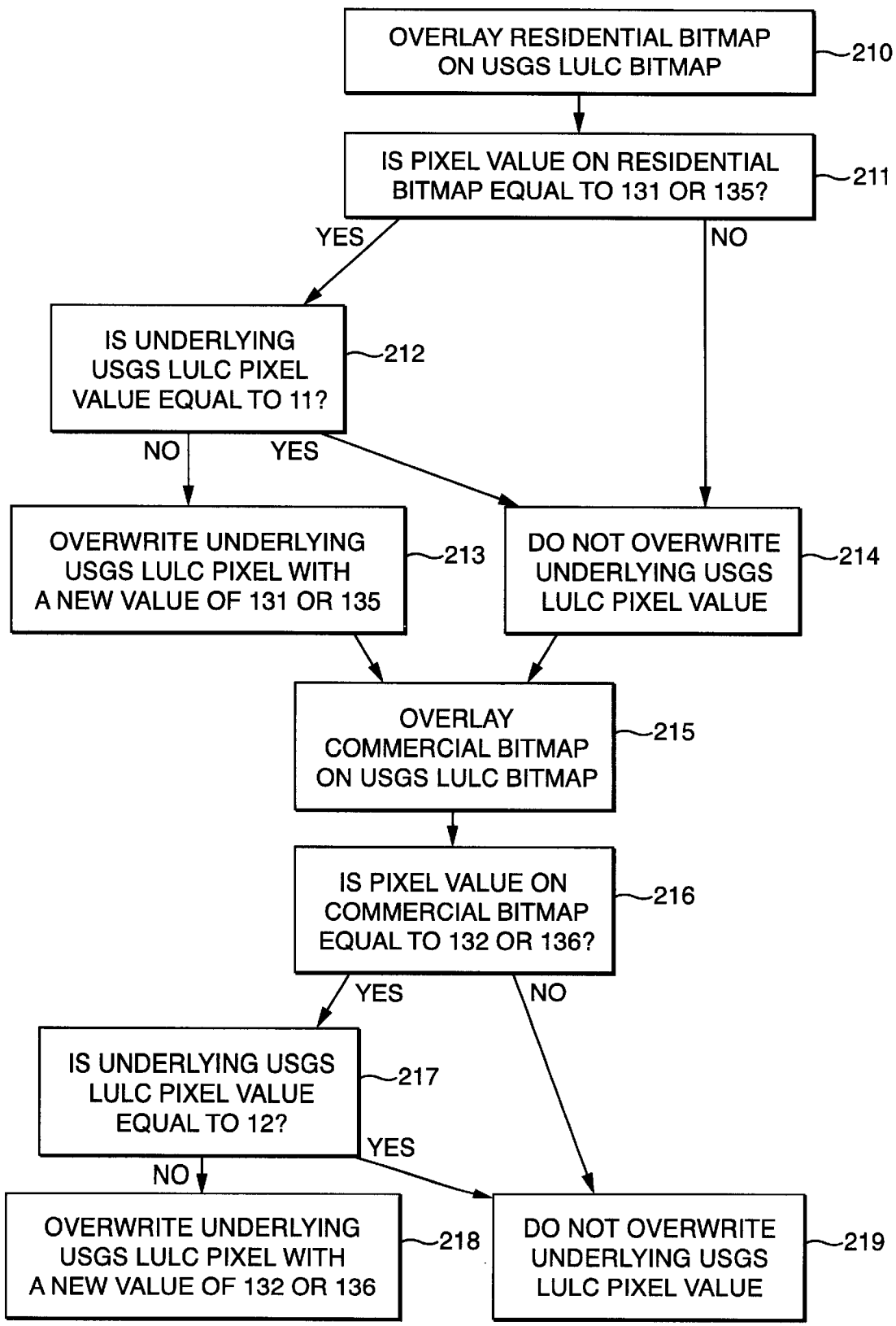

Referring to FIG. 4b, further steps are shown that provide more detail of step 16 of FIG. 3. In step 210, the residential bitmap is overlayed on the USGS LULC bitmap. The pixels in the residential bitmap are processed as follows. In step 211, a branch in the flow occurs depending on whether or not a pixel in the residential bitmap is equal to 131 or 135, signifying that the pixel corresponds to a residential ZIP+4. If the pixel is equal to 131 or 135, step 212 is taken where another branch in the flow occurs depending on whether or not the corresponding pixel on the USGS LULC bitmap is equal to 11, signifying that the pixel corresponds to a residential ZIP+4. If the pixel is not equal to 11, in step 213 the corresponding USGS LULC pixel is overwritten with the same value of the corresponding residential bitmap, which is 131 or 135. If the pixel is equal to 11, in step 214 the USGS LULC pixel is not overwritten, but rather left with its original value. If the pixel in the residential bitmap is not equal to 131 or 135, step 214 is taken and the underlying pixel is again left with its original value. In step 215, the commercial bitmap is overlayed on the USGS LULC bitmap. The pixels in the commercial bitmap are processed as follows. In step 216, a branch in the flow occurs depending on whether or not a pixel in the commercial bitmap is equal to 132 or 136, signifying that the pixel corresponds to a commercial ZIP+4. If the pixel is equal to 132 or 136, step 217 is taken where another branch in the flow occurs depending on whether or not the corresponding pixel on the USGS LULC bitmap is equal to 12, signifying that the pixel corresponds to a commercial ZIP+4. If the pixel is not equal to 12, in step 218 the corresponding USGS LULC pixel is overwritten with the same value of the corresponding commercial bitmap, which is 132 or 136. If the pixel is equal to 12, in step 219 the USGS LULC pixel is not overwritten, but rather left with its original value. If the pixel in the commercial bitmap is not equal to 132 or 136, step 219 is taken and the underlying pixel is again left with its original value.

Figure 5A:
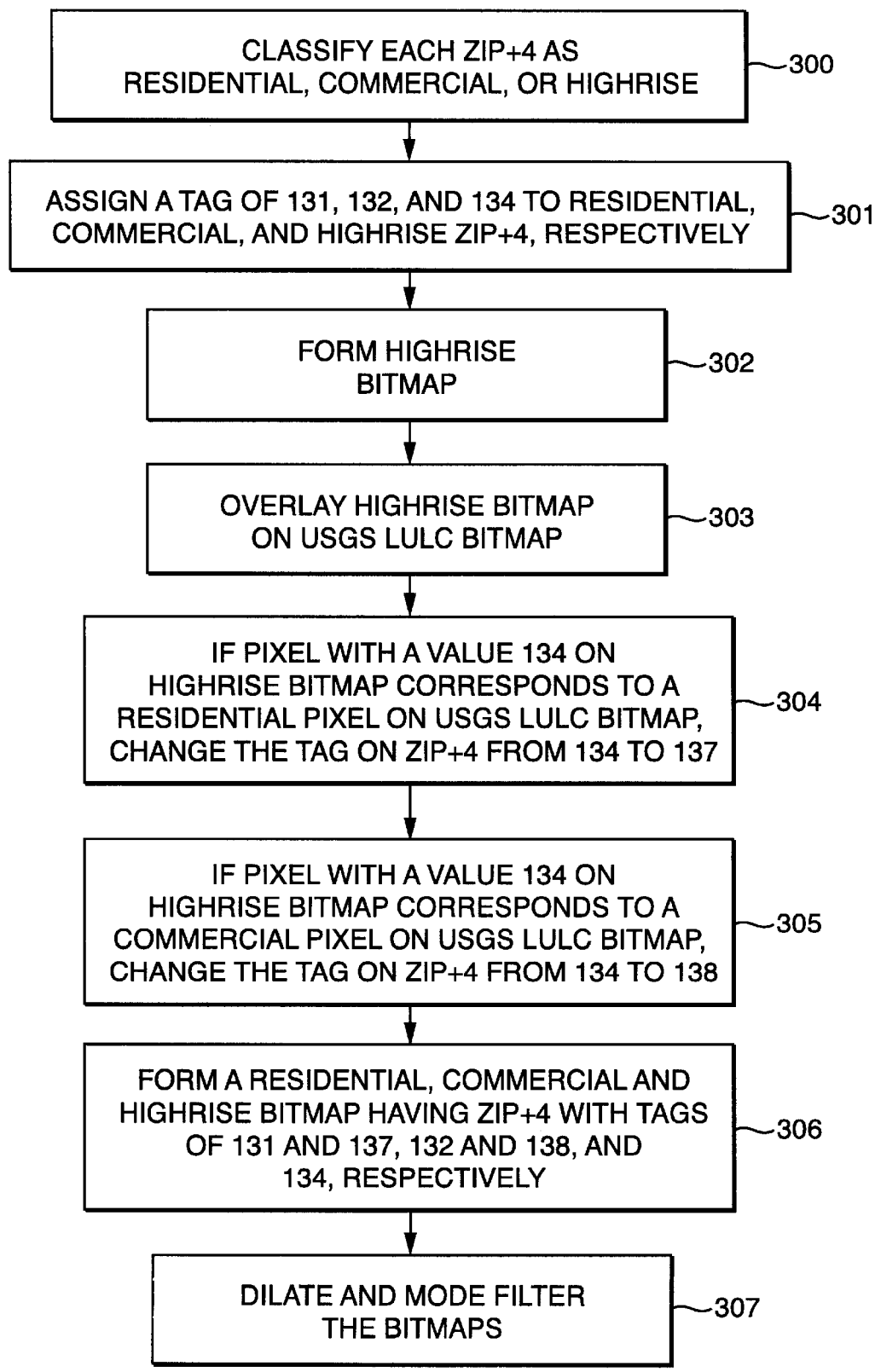
FIGS. 5a and 5b are examples of flow charts including steps to help update LULC map data without the use of an InfoUSA™ database in one embodiment of the present invention.

Referring to FIG. 5a, an example of a flow chart is presented that includes more details of steps 12–14 of FIG. 3, which does not utilize a business listings data base such as InfoUSA™, or Acxiom™. In step 300, each ZIP+4 in the AOI is classified as residential, commercial, or highrise by using the US Postal Service's ZIP+4 data. In step 301, the residential, commercial, and highrise ZIP+4s are assigned tags of 131, 132, and 134, respectively. In step 302, a highrise bitmap is formed making use of the data tagged with a value of 134. In step 303, the highrise bitmap is overlayed on the USGS LULC bitmap. In step 304, if a pixel on the highrise bitmap having a value of 134 corresponds to a residential pixel on the USGS LULC bitmap (i.e., has a value of 11), then change the value of 134 to a new value of 137. In step 305, if a pixel on the highrise bitmap having a value of 134 corresponds to a commercial pixel on the USGS LULC bitmap (i.e., has a value of 12), then change the value of 134 to a new value of 138. In step 306, a residential, commercial, and highrise bitmap are formed having ZIP+4s with tags of 131 and 137, 132 and 138, and 134, respectively. The residential bitmap has pixels that have a value of 131, 137, or, for the null background, a value of zero. The commercial bitmap has pixels that have a value of 132, 138, or, for the null background, a value of zero. And finally, the highrise bitmap has pixels that have a value of 134, or, for the null background, a value of zero; those pixels in the highrise bitmap having a value of 134 are thus the ones which were incapable of being resolved into residential and commercial classifications by using the US Postal Service's database as described above. Finally, in step 307, the three bitmaps may be dilated and mode filtered as described below.

Figure 5B:
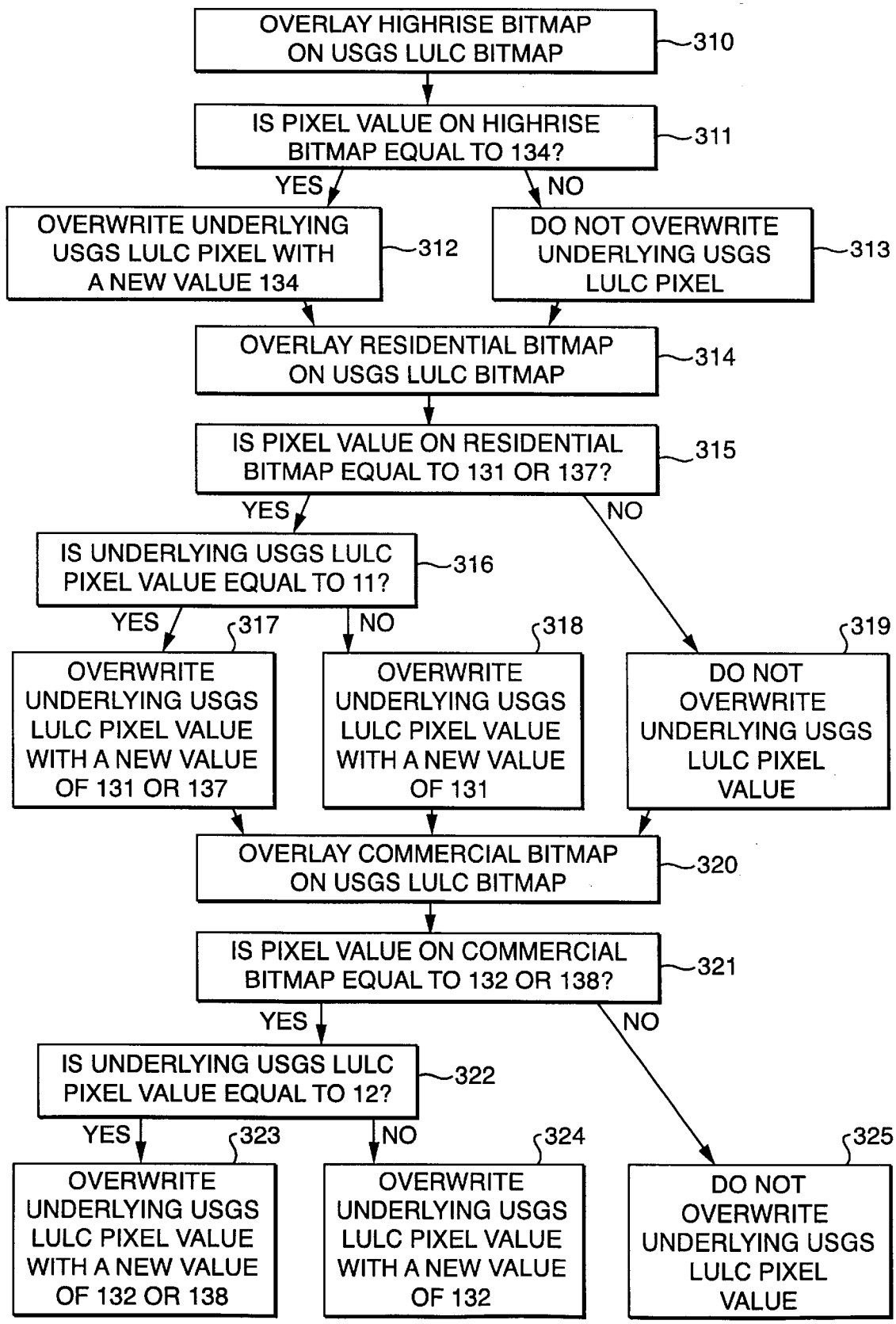

Referring to FIG. 5*b*, further steps are shown that provide more detail of step 16 of FIG. 3 without making use of an InfoUSA™ database. In step 310, the highrise bitmap is overlayed on the USGS LULC bitmap. In step 311, a branch in the flow occurs depending on whether or not the highrise pixel value under consideration is or is not equal to 134. If the value is equal to 134, in step 312, the corresponding USGS LULC pixel is rewritten with a value of 134. (In light of the previous steps in FIG. 5*a*, the old pixel value on the USGS LULC bitmap that is rewritten in step 312 cannot be an 11 or 12.) If the value is not equal to 134, in step 313, the corresponding USGS LULC pixel is not overwritten. In step 314, the residential bitmap is overlayed on the USGS LULC bitmap. In step 315, a branch in the flow occurs depending on whether or not the pixel being considered is equal to 131 or 137. If the pixel value is equal to 131 or 137, then step 316 is taken in which another branch in the flow occurs depending on whether or not the corresponding USGS LULC pixel has a value of 11. If it does have a value of 11, in step 317, the corresponding USGS LULC pixel is overwritten with the same value of the corresponding residential bitmap, which is 131, or 137. If it does not have a value of 11, in step 318, the corresponding USGS LULC pixel value is overwritten with the same value of the corresponding residential bitmap, which is 131. If the pixel value is not equal to 131, or 137, then in step 319, the corresponding USGS LULC pixel value is not overwritten.

In step 320, the commercial bitmap is overlayed on the USGS LULC bitmap. In step 321, a branch in the flow occurs depending on whether or not the pixel being considered is equal to 132 or 138. If the pixel value is equal to 132, or 138, then step 322 is taken in which another branch in the flow occurs depending on whether or not the corresponding USGS LULC pixel has a value of 12. If it does have a value of 12, then in step 323, the corresponding USGS LULC is overwritten with the same value of the corresponding commercial bitmap, which is 132, or 138. If it does not have a value of 12, in step 324, the corresponding USGS LULC pixel value is overwritten with the same value of the corresponding commercial bitmap, which is 132. If the pixel value is not equal to 132, or 138, then in step 325, the corresponding USGS LULC pixel value is not overwritten.

Of course, the arbitrary correspondence chosen between a subset of the natural numbers, {1, 2, 3, . . . }, and the residential, commercial, or highrise classification is illustrative. There is no a priori reason that, for example, 131, 135, and 137 could not have corresponded to a commercial, instead of a residential, classification. For that matter, any other numbers, 1001, 1005, and 1007, for example, could have been chosen to correspond to the residential classification. What is desirable is that the correspondence used is known and unambiguous.

Figure 6:
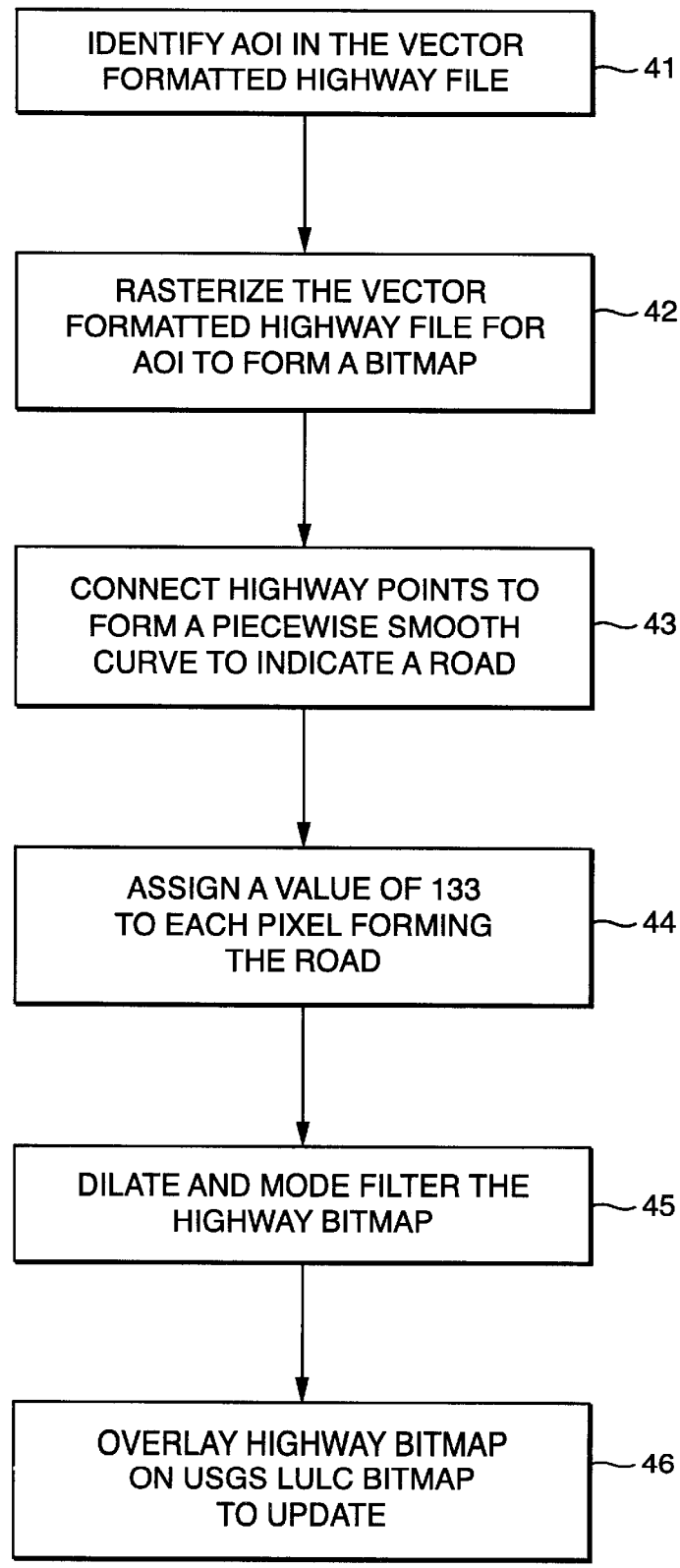
FIG. 6 is an example of a flow chart including steps to include highway data in one embodiment of the present invention.

Referring to FIG. 6, a flow chart is presented that provides more details of step 15 and 16 in FIG. 3. Highway data, which may be obtained from such commercial vendors like GDT™, may be used to update the USGS LULC map. This highway data may be used to identify various roads in a geographic area. The GDT™ highway data is available in a vector-formatted file. In step 41, the AOI in the highway file is identified. In step 42, the vector-formatted file for the AOI is rasterized to form a highway bitmap. In step 43, the highway points are connected to form a piecewise-smooth curve to indicate a road. In step 44, a value of 133 is assigned to each pixel forming the road. In step 45, the highway bitmap is dilated and mode filtered, as described below. In step 46, the highway bitmap is overlayed on the USGS LULC bitmap to overwrite the highway pixels that form a road.

To perform the dilation and mode filtering mentioned above, several types of software programs designed for this purpose may be utilized as known to those of ordinary skill in the art. In one embodiment, dilating and PCI™ filtering software may be utilized. The description of this software described below that may be used to update LULC map data is adapted from PCI™ Geomatics Software, version 6.2 (1997). The dilation is an operation on a kernel, or structuring element, with its background (image data where the operation is applied). A kernel is a structure with a well-defined position of the pixel of interest, which may lie within or outside the kernel. An example of a kernel that may be used is a circular disk with the pixel of interest at the center. The size of the disk is an input parameter of this function, and can be varied. With the kernel sweeping across every pixel on the image, if the center of the kernel is within the image boundary, then the area underneath the kernel may assume the value of the kernel. The effect of the dilation is to blur the bitmap to give a more continuous surface. Finally, in steps 207 and 307, each of the bitmaps is processed with a mode filter.

The mode filter computes the mode of the grey-level values inside the filter window surrounding each pixel. Mode filtering may be utilized for removing small, extraneous islands of data by replacing them with their surrounding data, thus eliminating "speckles."

One example pertaining to the filtering procedure may be provided as follows. The minimum and maximum filter size may be 1×3, and 7×7, respectively; the filter window need not be square. If a preservation flag is set to "on" in the filtering procedure, a pixel is mode filtered only if the number of times the central pixel value appears in the 3×3 window surrounding it is less than three. The preservation flag may be set to "on" only for a 3×3 filter window, in this example. This may help preserve bona fide thin features, such as streams or roads, when filtering. A mask parameter may be used to. define the area within the input channel that is processed. The area under the mask may be filtered, while the rest of the image may be left unaltered. If a single value is specified for the mask parameter, then this value points to a bitmap segment, which defines the region to be filtered. If, however, four values are specified, these values specify the x and y offsets and x and y dimensions of the rectangular region inside the image to be filtered. By default, the entire database may be processed. The foregoing parameters and data are illustrative; other parameters and data may be used as known to those skilled in the art.

To mode filter, the mode of the grey-level values (the most frequently occurring grey-level value) within the filter window surrounding each pixel may be computed. Near the edges, the filtering procedure may add pixel values to ensure that there is sufficient data available.

Figure 7:
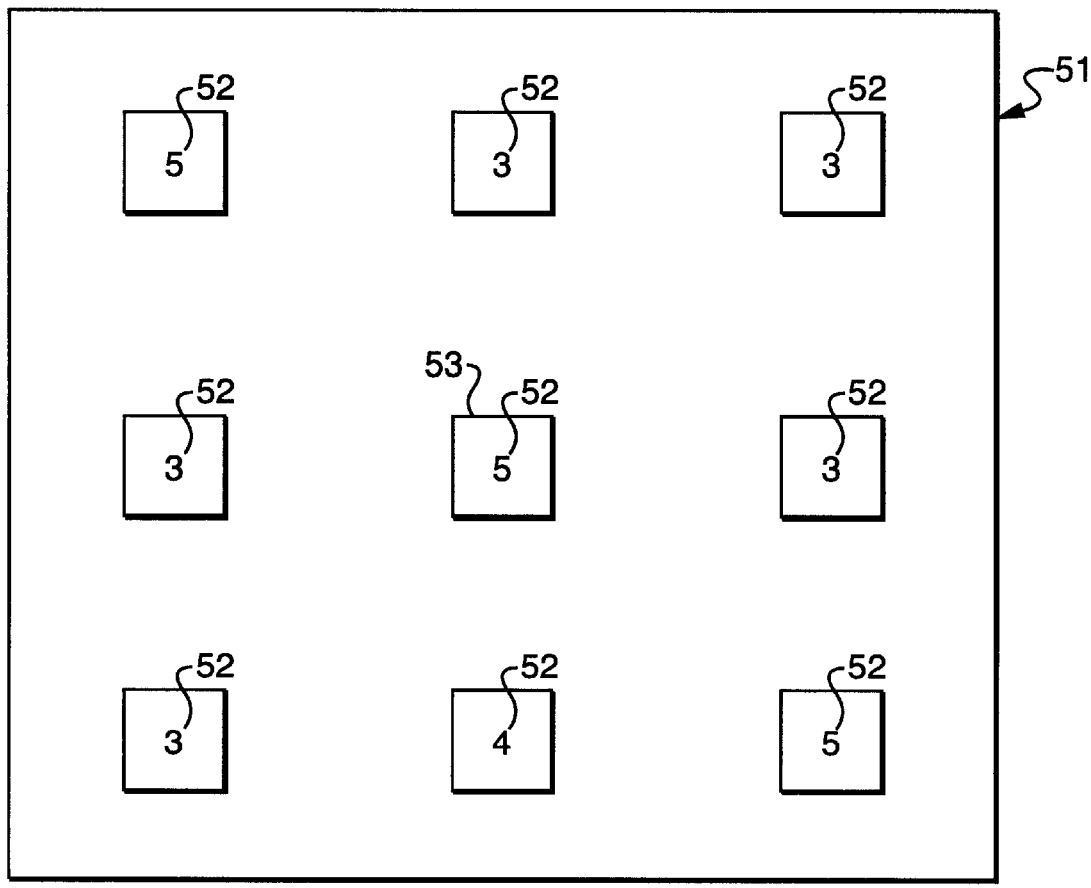
FIG. 7 is a schematic of an example of a 3×3 filter window that may be used in one embodiment of the present invention.

In FIG. 7 appears an example of a 3×3 filter window 51. The filter window 51 surrounds nine numbers, one for each pixel, representing grey-level values 52. The central pixel 53 has a value of 5. If the preservation flag is set to "off," and is used with the foregoing illustrative parameters and data, the filtered pixel of the filter window 51 is set to 3 because this is the most frequently occurring number in the filter window 51. If, on the other hand, the preservation flag is set to "on," the filtered pixel of the filter window 51 is set to 5, the value of the central pixel 53, because three, the number of times 5 is present in the window 51, is not less than three.

Figure 8:
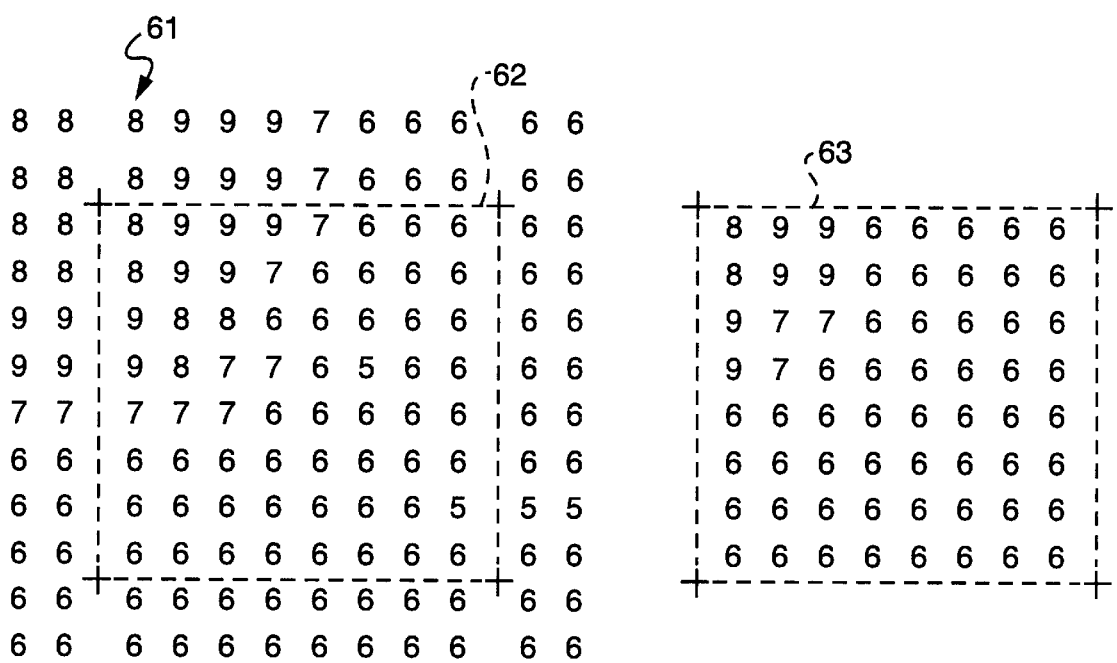
FIG. 8 is a schematic of an example showing the effect of using a 5×5 filter on an 8×8 database image in one embodiment of the present invention.

In FIG. 8 appears an example of using a 5×5 filter on an 8×8 database image. The preservation flag is set to "off" in this example. Unfiltered image 61 is depicted with a database image box 62, and pixels corresponding to grey-level values of a bitmap. The image that results after the filtering has occurred appears as filtered image 63. In the unfiltered image 61, columns and scanlines outside the database image box 62 correspond to the last image column or scanline used again when the filter does not have a full window.

Updating the LULC map data as described in the preceding paragraphs may be accomplished using a variety of hardware and software that may be commercial and/or proprietary in accordance with a particular implementation and application. For example, one embodiment utilizes a Dell Precision computer with a 450 MHz Pentium III processor and 512 MB RAM, and running the Windows NT operating system to update LULC map data.

In addition, the use of PCI™, and its associated scripting language EASI or PACE, may be used in one embodiment as an environment for file storage management, viewing, and printing the LULC map data. The scripting language may be used to build particular applications from smaller functional modules. For example, a procedure may be implemented to find the edge of a binary, two-tone bitmap in the computer language C. This procedure may then be called in an EASI statement, which results in the edge extraction of a previously loaded binary image. The particular software used may vary in accordance with each embodiment and desired configuration.

Figure 9:
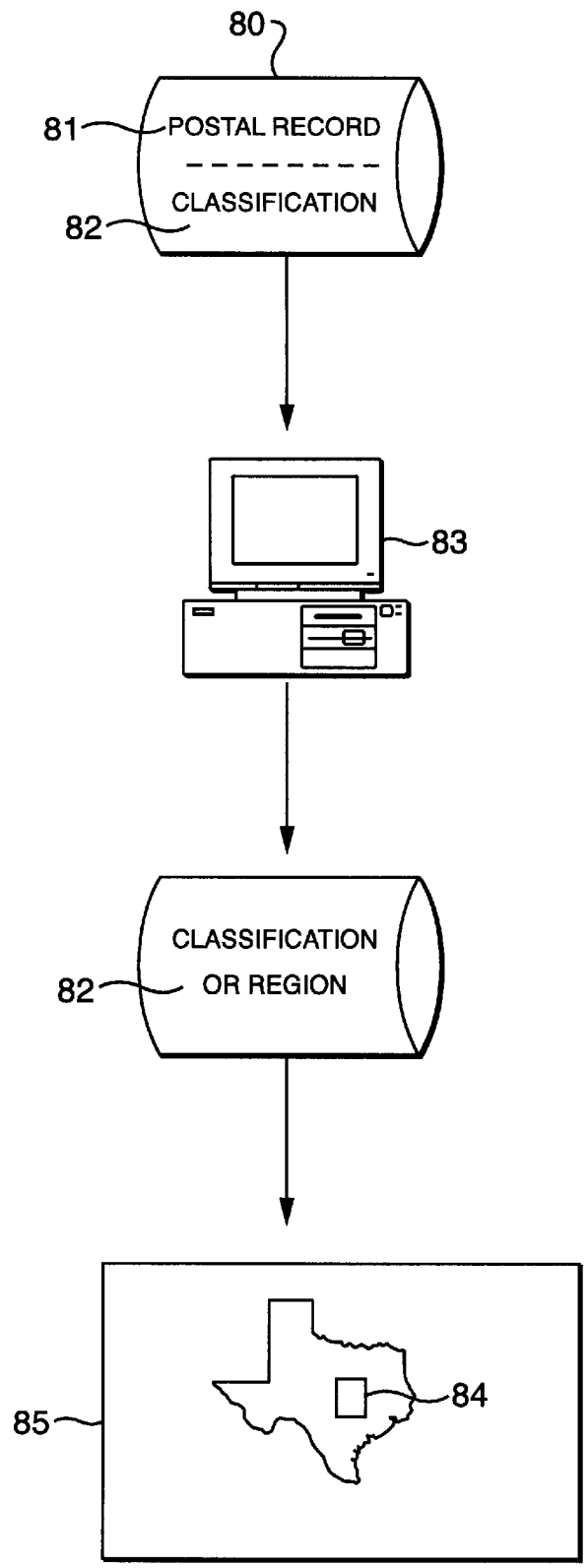
FIG. 9 illustrates a system that may be used to update LULC data in one embodiment of the present invention.

Referring now to FIG. 9, a system for updating land use and land cover data that provide a land classification of a region 84 on a map 85 is shown for one embodiment of the present invention. In this embodiment, the map 85 is that of the United States, and the region 84 is an area in the northwestern part of the map. In other embodiments, the map may be a bitmap, and a region may be a part of the bitmap associated with a pixel. The system may include a database 80 having a postal record 81, associated with the region 84, and a corresponding land classification 82. The system may further include a processor 83, coupled to the database 80, for updating the data by replacing the land classification of the region 84 on the map 85 with the corresponding land classification 82.

While the invention has been disclosed in connection with the preferred embodiments shown and described in detail, various modifications and improvements thereon will become readily apparent to those skilled in the art. For example, although data from ZIP+4 were mentioned herein, the data utilized need not be ZIP+4 data: other types of postal data may be used to update LULC map data. Accordingly, the spirit and scope of the present invention are to be limited only by the following claims.

We claim:

1. A method for updating land use and land cover data that provide a land classification of a region on a map, the method comprising:
    a) obtaining a postal record, associated with the region, and a corresponding land classification;
    b) obtaining a first bitmap that associates the region with the land classification;
    c) constructing a second bitmap that associates the region with the corresponding land classification;
    d) overlaying the second bitmap on the first bitmap to update the data; and
    e) updating the data by replacing the land classification of the region on the map with the corresponding land classification.

2. A method as in claim 1, wherein, in the step of obtaining a postal record, the postal record includes a ZIP+4 code.

3. A method as in claim 1, wherein, in the step of obtaining a postal record, the corresponding classification includes at least one of a residential classification, commercial classification, and highrise classification.

4. A method as in claim 1, wherein the step of updating the data includes dilating the data.

5. A method as in claim 1, wherein the step of updating the data includes filtering the data.

6. A method as in claim 1, further including utilizing data that provides a location of a highway in the region for indicating a position of the highway on the map.

7. A system for updating land use and land cover data that provide a land classification of a region on a map, the system comprising:
    a) a database having a postal record, associated with the region, and a corresponding land classification; and
    b) a processor, coupled to the database, for updating the data by replacing the land classification of the region on the map with the corresponding land classification; and
        wherein a first bitmap that associates the region with the land classification is obtained, a second bitmap that associates the region with the corresponding land classification is constructed, and the second bitmap is overlayed on the first bitmap to update the data.

8. A system as in claim 7, wherein the postal record includes a ZIP+4 code.

9. A system as in claim 7, wherein the corresponding classification includes at least one of a residential classification, a commercial classification, and a highrise classification.

* * * * *